United States Patent
Wei et al.

(10) Patent No.: US 9,454,024 B1
(45) Date of Patent: Sep. 27, 2016

(54) COMPOSITE REPAIRING APPARATUS FOR LIQUID CRYSTAL PANEL

(71) Applicants: Boe Technology Group Co., Ltd., Beijing (CN); Hefei Xinsheng Optoelectronics Technology Co., Ltd., Anhui (CN)

(72) Inventors: Pingyu Wei, Beijing (CN); Tao Li, Beijing (CN); Jihua Wang, Beijing (CN); Dong Guo, Beijing (CN); Tao Wu, Beijing (CN)

(73) Assignees: Boe Technology Group Co., Ltd., Beijing (CN); Beijing Boe Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/744,194

(22) Filed: Jun. 19, 2015

(30) Foreign Application Priority Data

Mar. 31, 2015 (CN) .......................... 2015 1 0149330

(51) Int. Cl.
*G02F 1/1339* (2006.01)
*G02F 1/1333* (2006.01)
*G02F 1/13* (2006.01)
*G02F 1/1362* (2006.01)

(52) U.S. Cl.
CPC .......... *G02F 1/1303* (2013.01); *G02F 1/1309* (2013.01); *G02F 1/136259* (2013.01); *G02F 2001/136263* (2013.01)

(58) Field of Classification Search
CPC .......... G02F 1/1303; G02F 1/136259; G02F 1/1309; G02F 2001/136263
See application file for complete search history.

(56) References Cited

U.S. PATENT DOCUMENTS

| | | | |
|---|---|---|---|
| 2008/0049180 A1* | 2/2008 | Kim .................. | G02F 1/1337 349/126 |
| 2008/0139075 A1* | 6/2008 | Birrell ................ | B23K 26/046 445/61 |

* cited by examiner

*Primary Examiner* — Tracie Y Green
(74) *Attorney, Agent, or Firm* — Calfee, Halter & Griswold LLP

(57) ABSTRACT

The invention refers to a technical field of display device producing, and discloses a composite repairing apparatus for liquid crystal display panel. The repairing device has a repairing device, which includes a gantry slidably assembled on the lighting device, which gantry being slidably assembled with a observation camera, a metal line repairing laser and a repairing laser employing black matrix diffusion; a driving device for driving the gantry to slide and driving the observation camera, the metal line repairing laser and the repairing laser employing black matrix diffusion to slide; a control device, for determining the positions of the defects in the panel according to the displayed images collected by the observation camera, and controlling the metal line repairing laser and the repairing laser employing black matrix diffusion to repair the panel defects.

11 Claims, 2 Drawing Sheets

COMPOSITE REPAIRING APPARATUS FOR LIQUID CRYSTAL PANEL

RELATED APPLICATIONS

The present application claims the benefit of Chinese Patent Application No. 201510149330.1, filed on Mar. 31, 2015, the entire disclosure of which is incorporated herein by reference.

TECHNICAL FIELD

The invention refers to a technical field of display device producing, and more specifically to a composite repairing apparatus for liquid crystal panel.

BACKGROUND

During manufacturing of the aligned liquid crystal panel, after segmenting, the aligned liquid crystal substrate is segmented into liquid crystal panels of different sizes, which is followed by a process of lighting and detecting the liquid crystal panel. During this process, various defects, such as bright dot and bright line, would be detected. The dot defect and line defect can be repaired by a laser repairing apparatus, thus improving the panel yield.

Currently, the above process would normally be performed according to the routine shown in FIG. 1: firstly, detecting the panel on the lighting apparatus 13; during detection, the lighting apparatus 13 makes the panel display images, and detects the defects such as bright dot and bright line on the display panel, and determines the position coordinates of the defects, then transmits the defect information and the defect coordinates to the repairing apparatuses (11 and 12); the repairing apparatuses repair the defects according to the position coordinates of the defects. The repairing apparatuses can be classified into two kinds: one is a metal line repairing apparatus 11 (for repairing bright line), mainly for repairing on the side of TFT; the other is a repairing apparatus 12 employing black matrix diffusion (for repairing bright dot), mainly for repairing on the side of CF. The repaired panel would be detected in the lighting apparatus again, to confirm the repairing result. When there are bright dot and bright line on the same panel, the above three apparatuses are needed to be used for repairing. The whole repairing course is relatively cumbersome.

SUMMARY

The invention provides a composite repairing device for liquid crystal panel, for improving the repairing efficiency for the liquid crystal panel.

The invention provides a composite repairing device for liquid crystal panel, which comprises:

A lighting device, for lighting the panel to be detected to make it display images;

A repairing device, includes a gantry slidably assembled on the lighting device, which gantry is slidably assembled with a observation camera for collecting the displayed images of the panel, and a metal line repairing laser and a repairing laser employing black matrix diffusion for repairing the panel;

A first driving device, for respectively driving the gantry to slide, and driving the observation camera, the metal line repairing laser and the repairing laser employing black matrix diffusion to slide on the gantry;

A control device, for controlling the first driving device to drive the observation camera to slide above the panel, determining positions of defects in the panel according to the displayed images collected by the observation camera, and controlling the first driving device to drive the metal line repairing laser and the repairing laser employing black matrix diffusion to slide above the positions of the defects in the panel and repair the defects in the panel.

In the above technical solution, the bright dot and the bright line in the panel are repaired by the provided metal line repairing laser and repairing laser employing black matrix diffusion, therefore the repairing of the panel would be done by one apparatus, which simplifies the devices for repairing panel. Meanwhile, by repairing with one apparatus, the repairing efficiency of panel is improved, that is, repairing of the different defects in the panel can be done only by the repairing apparatus provided.

Preferably, the lighting device includes:

A base;

A backlight source provided on the base and for illuminating the panel to be detected;

A transparent supporting board located on the backlight source and for supporting the panel to be detected;

A signal generator and a contacting device connected to the signal generator, the contacting device communicatively connecting to the detected panel and providing display signal to the detected panel. The lighting device makes the detected panel display images.

Preferably, the composite repairing device of liquid crystal panel has an upper polarizer and a lower polarizer. Therein, the lower polarizer is disposed under the transparent supporting board, and the upper polarizer is disposed in the observation camera.

Preferably, the observation camera is provided with a holder for the upper polarizer, and the upper polarizer is fixed on the holder for the upper polarizer.

Preferably, the signal generator is fixed on the base, and the contacting device includes: a vertical moving slide block slideably assembled on the base and slidable along the vertical direction, a lighting block slideably assembled on the vertical moving slide block and slidable along the horizontal direction, a carrier block provided on the lighting block. And there are pins fixed on the carrier block, therein the pins communicatively connect to the signal generator through the circuit board. This improves the adaptability of the whole apparatus.

Preferably, the carrier block rotatably connects to the lighting block and can be locked in one of two working positions, and when the carrier block is locked in one of the two working positions, the pins are upward, and when the carrier block is locked in another of the two working positions, the pins are downward. This meets the need of different ways of lighting for repairing.

Preferably, the lighting device further includes a second driving device for driving the vertical moving slide block and the lighting block to slide respectively. This improves efficiency.

Optionally, the second driving device includes a driving motor for driving the vertical moving slide block to slide and a driving motor for driving the lighting block to slide.

Preferably, the collection scope of the field of view of the observation camera is not less than ⅑ of the area of the panel, and the resolution of the observation camera is not lower than three times of the resolution of the panel.

Preferably, the control device is further used for comparing the panel defects shown on the images collected by the observation camera with a preset defect level, and when a panel defect exceeds the preset level, the defect is determined to be irreparable.

Preferably, the apparatus further comprises lens device for transmitting the light emitted from the metal line repairing laser and the repairing laser employing black matrix diffusion, which lens device includes a set of lens with different magnifications.

LIST OF THE REFERENCE NUMBERS

11: metal line repairing device; 12: repairing device employing black matrix diffusion; 13: lighting and detecting device;
21: base; 22: transparent supporting board; 23: lower polarizer;
24: backlight source; 25: gantry; 26: metal line repairing laser;
27: lens device; 28: repairing device employing black matrix diffusion;
29: observation camera;
210: control device; 211: signal generator; 212: panel;
213: contacting device; 214: holder for upper polarizer;
31: panel (CF upward);
32: vertical moving slide block; 33: driving motor; 34: lighting block;
35: driving motor; 36: carrier block; 37: pins
38: circuit board; 39: connection line; 310: connection line;
41: panel (TFT upward)

DETAIL EMBODIMENTS

In order to improve the repairing efficiency of liquid crystal panel and simplify the repairing procedure of liquid crystal panel, a composite repairing apparatus for liquid crystal panel is provided by an embodiment of the invention. In the technical solution of the embodiment of the invention, the metal line and black matrix defects on the liquid crystal panel can all be repaired by the repairing apparatus provided, so that the repairing efficiency of liquid crystal panel is improved. Meanwhile, when repairing liquid crystal panel with one apparatus, the images are only needed to be collected once, which simplifies the repairing procedure. For facilitating understanding of the technical solution provided by the embodiment, the technical solution provided by the embodiment of the invention will be described in detail blow in combination with the figures and the specific embodiments.

Figure 1:
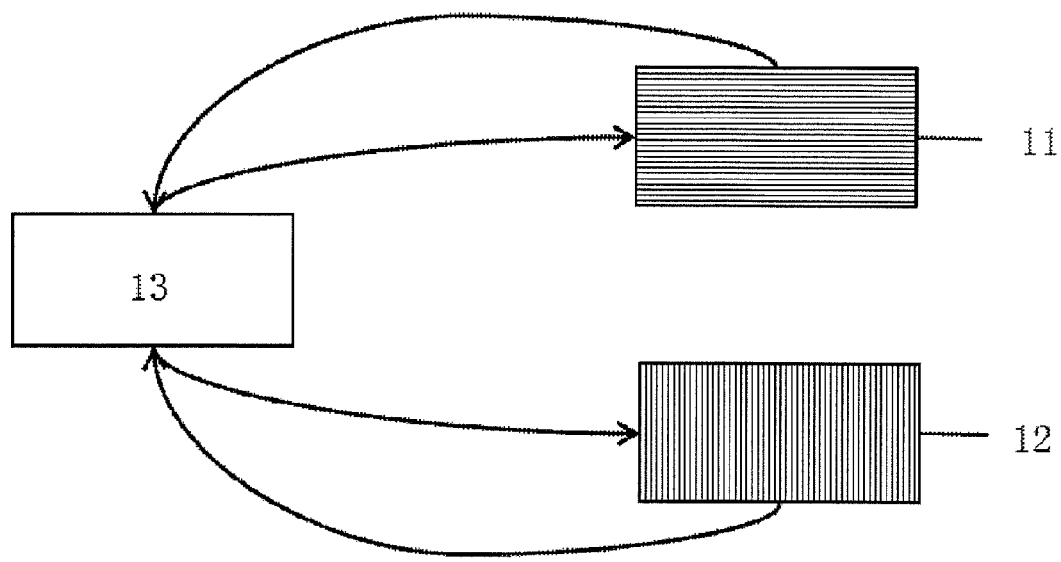
FIG. 1 is a flow diagram of composite repairing of liquid crystal panel provided in prior art.
Figure 2:
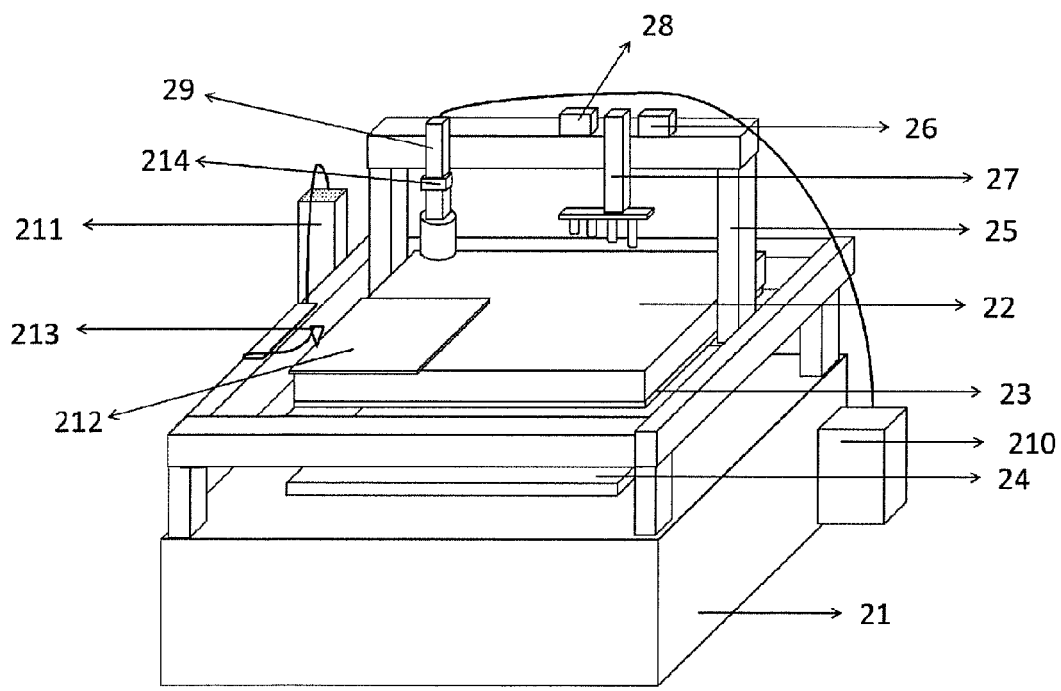
FIG. 2 is a front view of the composite repairing apparatus for liquid crystal panel provided by an embodiment of the invention.

As shown in FIG. 2, FIG. 2 shows a structure schematic diagram of a composite repairing apparatus for liquid crystal panel provided by the embodiment of the invention.

The embodiment of the invention provides a composite repairing apparatus for liquid crystal panel 212, which comprises:

A lighting device, for lighting the panel to be detected to make it display images;

A repairing device, includes a gantry 25 slidably assembled on the base 21, which gantry 25 being slidably assembled with a observation camera 29 for collecting the displayed images of the panel 212, and a metal line repairing laser 26 and a repairing laser 28 employing black matrix diffusion for repairing the panel 212, therein a upper polarizer cooperating with a lower polarizer 23 is provided in the observation camera 29;

A first driving device, for respectively driving the gantry 25 to slide, and driving the observation camera 29, the metal line repairing laser 26 and the repairing laser employing black matrix diffusion 28 to slide on the gantry 25;

A control device 210, for controlling the first driving device to drive the observation camera 29 to slide above the panel 212, determining position of a defect in the panel 212 according to the displayed images collected by the observation camera 29, and controlling the first driving device to drive the metal line repairing laser 26 and the repairing laser employing black matrix diffusion 28 to slide above the position of the defect in the panel 212 and repair the defect in the panel 212.

In the above technical solution, the bright dot and the bright line in the panel 212 are repaired by the provided metal line repairing laser 26 and repairing laser 28 employing black matrix diffusion, therefore the repairing of the panel 212 would be done by one apparatus, which simplifies the devices for repairing panel 212. Meanwhile, by repairing with one apparatus, the repairing efficiency of the panel 212 is improved, that is, repairing of the different defects in the panel 212 can be done only by the repairing apparatus provided.

For facilitating understanding to the repairing apparatus provided by the embodiment, it will be described in detail below in combination with the figures and the specific embodiments.

Continuing to refer to FIG. 2, it can be seen from FIG. 2, the lighting device provided by the embodiment includes: a base 21; a backlight source 24 provided on the base 21 and for illuminating the panel 212 to be detected; a transparent supporting board 22 located on the backlight source 24 and for supporting the panel 212 to be detected; a signal generator 211 and a contacting device 213 connected to the signal generator 211, the contacting device 213 communicatively connecting to the detected panel 212 and providing display signal to the detected panel 212. The lighting device makes the detected panel display images. Besides, polarizers are needed for displaying images. Therein, the lower polarizer 23 is disposed under the transparent supporting board 22, and the upper polarizer is disposed in the observation camera 29, so that the displayed images by the detected panel 212 can be seen by the observation camera 29.

Continuing to refer to FIG. 2, it can be seen from FIG. 2, in the embodiment when the panel 212 is detected, the panel 212 is placed on the transparent supporting board 22, and is provided with light illumination by the backlight source 24 disposed under the transparent supporting board 22. When the panel 212 is needed to be detected, the panel 212 is provided signal by the provided lighting device, so as to make panel 212 display images. When the images are displayed, by means of the two polarizers disposed on opposite sides of the panel 212 respectively, the images displayed by the panel 212 become images which can be seen by human eyes, wherein the upper polarizers is disposed in the observation camera 29. In specifically disposing, a holder 214 for the upper polarizer is provided in the observation camera 29, and the upper polarizer is fixed on the holder for the upper polarizer. The light to be collected by the observation camera 29 is converted into images which can be seen by human eyes via the upper polarizer. The lower polarizer 23 therein is disposed under the transparent supporting board 22. Specifically, the lower polarizer 23 is disposed on the side of the transparent supporting board 22 which is far away from the supporting surface, avoiding contact between the panel 212 and the lower polarizer 23, so as to avoid damage to the lower polarizer 23 when picking and placing the panel 212.

The above devices realize the function of the panel 212 displaying images, and make the observation camera 29 be able to collect the images displayed by the panel 212, so as to observe the defects in the panel 212 by the displayed images. Specifically, during collecting, in the control device 210, a planar coordinate system with a corner or center of the supporting board 22 as the origin is established. When placing the panel 212, two edges of the panel 212 are aligned with two edges of the transparent supporting board 22, so that after the panel 212 is placed on the transparent supporting board 22, it corresponds to the established coordinate system. When the panel 212 begins to display images after being lighten, the control device 210 controls the gantry 25 to slide. As shown in FIG. 2, the sliding direction of the gantry 25 is the horizontal direction, and two vertical posts of the gantry 25 are located on left and right sides of the transparent supporting board 22. In specifically disposing, they can be disposed on the left and right sides of the transparent supporting board 22, or on the front and back sides of the transparent supporting board 22, and the specific sliding direction is unlimited. Besides, when collecting the images of the panel 212 is needed, the control device 210 controls the first driving device to respectively drive the gantry 25 and the observation camera 29 to slide, and make the same above the panel 212, and the control device 210 controls the gantry 25 to slide and controls the observation camera 29 to collect the images displayed on the panel 212 according to the coordinate system preset and the position of the panel 212. Therein, preferably, the collection scope of the field of view of the observation camera 29 is not less than 1/9 of the area of the panel 212, and the resolution of the observation camera 29 is not lower than three times of the resolution of the panel 212. The defects on the panel 212 can only be distinguished by an observation camera 29 with a resolution higher than that of the panel 212. The field of view of the observation camera 29 is at least 1/9 of the panel 212, so that the whole panel 212 can be captured by capturing images less than or equal to 9, which increases efficiency. Of course, it is best that complete the whole capturing process by taking one shot. With the field of view of the observation camera 29 being 1/9 of the area of the panel 212 as an example, during capturing, the control device 210 controls the gantry 25 and the observation camera 29 to slide, so as to make the field of view of the observation camera 29 sweep over the whole panel 212.

Figure 3:
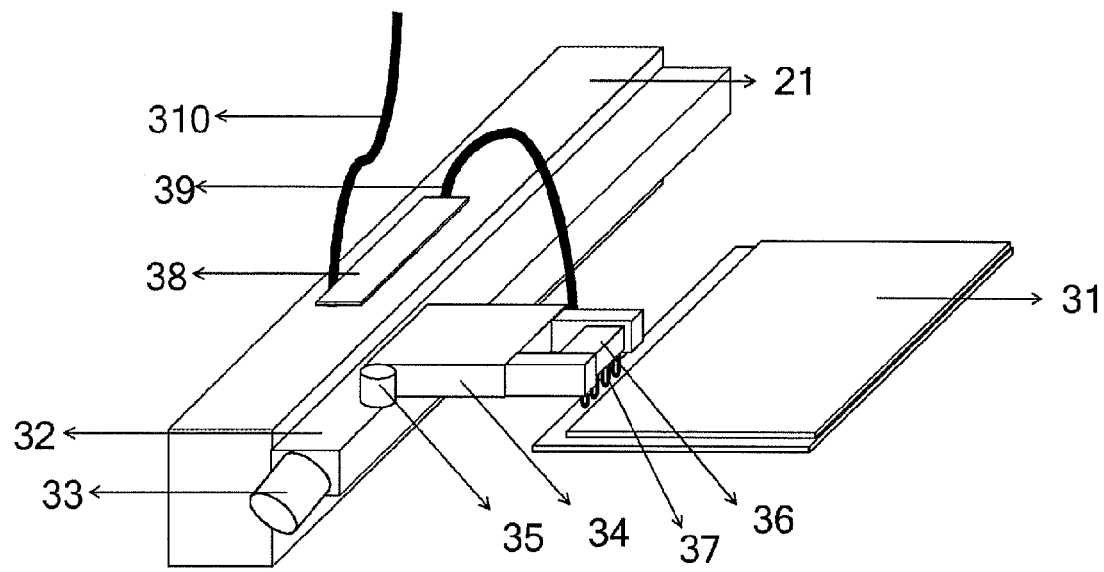
FIG. 3 is a schematic diagram of a working state of the lighting device provided by the embodiment of the invention.
Figure 4:
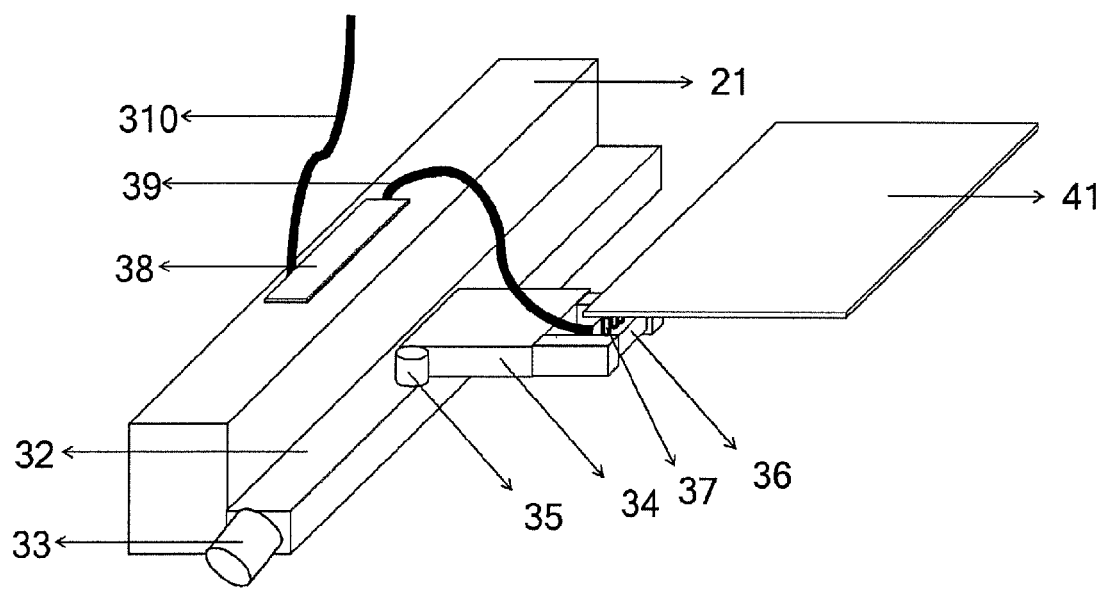
FIG. 4 is a schematic diagram of another working state of the lighting device provided by the embodiment of the invention.

The observation camera 29 transmits the images collected to the control device 210. The positions of the defects on the panel 212 in the coordinate system can be found by the preset coordinates. Therein, the defects specifically are bright dots and bright lines, which can be repaired by the metal line repairing laser 26 and the repairing laser 28 employing black matrix diffusion under control of the control device 210. Specifically, when only bright dot occurs, only black matrix needs repairing, while for the bright line, the metal line on the array substrate has to be repaired. Firstly with the bright dot occurring as an example, as shown in FIG. 3, at this time, the color film (CF) substrate of the panel 31 departs from the supporting surface of the transparent supporting board 22, that is, the color film substrate is upward. The observation camera 29 collects images to determine the position of the bright dot, and the control device 210 controls the gantry 25 and the repairing laser 28 employing black matrix diffusion to move above the position of the bright dot for repairing, so as to complete repairing to the panel 212. When there are bright dot and bright line on the panel 212, firstly repair the bright dot according to the above method, and then turn over the panel 212. At this time, as shown in FIG. 4, make the pins 37 on the lighting device upward, and light the display device continuously while the array substrate (TFT) of the panel 41 is upward. Meanwhile, control the gantry 25 and the metal line repairing laser 26 to move above the position of the bright line, and repair the metal line with the metal line repairing laser 26, so that the bright line on the panel 212 is eliminated. Besides, the apparatus further comprises lens device 27 for transmitting the light emitted from the metal line repairing laser 26 and the repairing laser 28 employing black matrix diffusion. Therein, the lens device 27 includes a set of lens with different magnifications. It can be seen from FIG. 2, the set of lens with different magnifications are disposed in the lens device 27 side by side, and the user can choose a lens with proper magnification as needed. The number of the lens with different magnifications is not limited by FIG. 2. Lens with different magnifications can be chosen for transmitting light according to the conditions of bright dot and bright line.

Besides, during actual repairing, the control device 210 is further used for comparing the defects of the panel 212 shown on the images collected by the observation camera 29 with a preset defect level, and when the defect of the panel 29 exceeds the preset level, the defect is determined to be irreparable. That is, the control device 210 is used for determining whether the bright dot and the bright line are reparable or not, and repairing the bright dot and bright line according to the result of determination.

In the above embodiment, the panel 212 is lighted by the lighting device, so as to display images. Therein, the lighting device includes: a signal generator 211 and a contacting device 213. Therein, the signal generator 211 is fixed on the base 21, and the contacting device 213 includes: a vertical moving slide block 32 slideably assembled on the base 21 and slidable along the vertical direction, a lighting block 34 slideably assembled on the vertical moving slide block 32 and slidable along the horizontal direction, a carrier block 36 provided on the lighting block 34. And there are pins 37 fixed on the carrier block 36, therein the pins 37 communicatively connect to the signal generator 211 through a circuit board 38. Specifically, the signal generator is fixed on the base 21, as shown in FIG. 2, and the base 21 includes a foundation and a holder disposed around the transparent supporting board 22 on which holder the signal generator is fixed, and the vertical moving slide block 32 in the contacting device 213 is slidably assembled on the holder and can slide along the vertical direction, and the lighting block 34 is slidably assembled on the vertical moving slide block 32 and can slide along the horizontal direction. By the above arrangement, there can be a larger gap between the pins 37 on the lighting device and the transparent supporting board 22 when placing the panel 212, so as to facilitate the placing of the panel 212. After the panel 212 is placed, the contact of the pins 37 and the panel 212 can be realized by sliding of the vertical moving slide block 32 and the lighting block 34. Meanwhile, the vertical moving slide block 32 can ensure the contact pressure between the panel 212 and the pins 37. Besides, the panel 212 which has connecting pins in different position can be adapted by the sliding of the lighting block 34 disposed, which improves the adaptability of the whole apparatus. Therein, the pins 37 connect to the circuit board 38 through a connection line 39, and the circuit board 38 in turn connects to the signal generator 211 through a connection line 310.

Besides, in the above embodiment, the carrier block 36 rotatably connects to the lighting block 34 and can be locked in one of two working positions, and when the carrier block 36 is locked in one of the two working positions, the pins 37 are upward or downward. As shown in FIGS. 3 and 4, FIG. 3 shows a state of the pins 37 being downward, and FIG. 4 shows a state of the pins 37 being upward. Therein, the carrier block 36 employs a way of rotatably connection to the lighting block 34, so that the pins 37 can face different directions, which accommodates different placements of the panel 212 when bright dot and bright line are being repaired.

Specifically, the lighting device further includes a second driving device for driving the vertical moving slide block 32 and the lighting block 34 to slide respectively, thus being able to drive sliding of the vertical moving slide block 32 and the lighting block 34 by machinery. Specifically, the second driving device includes a driving motor 33 for driving the vertical moving slide block 32 to slide and a driving motor 35 for driving the lighting block 34 to slide. As a preferred embodiment, preferably, the two driving motors connect to the control device 210 respectively, so that the position of the pins 37 of the lighting device is controlled by the control device 210.

Should be noted that, the above embodiments illustrate but no limit the invention, and those skilled in the art can understand and effect various variations to the embodiments disclosed in practicing the claimed invention from study of the figures, disclosure and appended claims. In the claims, any reference signs placed between the parentheses should not be construed to limit the claims. The wording "comprise" does not exclude the presences of other elements or steps which is unlisted in the claims. The indefinite article "a", "an" and "the" ahead of a element does not exclude the presence of a plurality of such elements. The mere fact that certain measures are recited in mutually different dependent claims does not indicate that a combination of these measures cannot be used to advantage.

The invention claimed is:

1. A composite repairing device for liquid crystal panel, comprising:
   a lighting device, for lighting the panel to be detected to make it display images;
   a repairing device including a gantry slidably assembled on the lighting device, wherein the gantry is slidably assembled with a observation camera for collecting the displayed images of the panel, and includes a metal line repairing laser and a repairing laser employing black matrix diffusion for repairing the panel;
   a first driving device, for respectively driving the gantry to slide, and driving the observation camera, the metal line repairing laser and the repairing laser employing black matrix diffusion to slide on the gantry;
   a control device, for controlling the first driving device to drive the observation camera to slide above the panel, determining positions of defects in the panel according to the displayed images collected by the observation camera, and controlling the first driving device to drive the metal line repairing laser and the repairing laser employing black matrix diffusion to slide above the positions of the defects in the panel and repair the defects in the panel.

2. The composite repairing device for liquid crystal panel as claimed in claim 1, wherein the lighting device includes:
   a base;
   a backlight source provided on the base and for illuminating the panel to be detected;
   a transparent supporting board located on the backlight source and for supporting the panel to be detected;
   a signal generator and a contacting device connected to the signal generator, the contacting device communicatively connecting to the detected panel and providing display signal to the detected panel.

3. The composite repairing device for liquid crystal panel as claimed in claim 2, wherein the composite repairing device of liquid crystal panel has an upper polarizer and a lower polarizer, therein the lower polarizer is disposed under the transparent supporting board, and the upper polarizer is disposed in the observation camera.

4. The composite repairing device for liquid crystal panel as claimed in claim 3, wherein the observation camera is provided with a holder for the upper polarizer, and the upper polarizer is fixed on the holder for the upper polarizer.

5. The composite repairing device for liquid crystal panel as claimed in claim 2, wherein the signal generator is fixed on the base; and the contacting device includes:
   a vertical moving slide block slideably assembled on the base and slidable along the vertical direction;
   a lighting block slideably assembled on the vertical moving slide block and slidable along the horizontal direction;
   a carrier block provided on the lighting block, and
   there are pins fixed on the carrier block, therein the pins communicatively connect to the signal generator through the circuit board.

6. The composite repairing device for liquid crystal panel as claimed in claim 5, wherein the carrier block rotatably connects to the lighting block and can be locked in one of two working positions, and when the carrier block is locked in one of the two working positions, the pins are upward, and when the carrier block is locked in another of the two working positions, the pins are downward.

7. The composite repairing device for liquid crystal panel as claimed in claim 5, wherein the lighting device further includes a second driving device for driving the vertical moving slide block and the lighting block to slide respectively.

8. The composite repairing device for liquid crystal panel as claimed in claim 7, wherein the second driving device includes a driving motor for driving the vertical moving slide block to slide and a driving motor for driving the lighting block to slide.

9. The composite repairing device for liquid crystal panel as claimed in claim 1, wherein the collection scope of the field of view of the observation camera is not less than ⅛ of the area of the panel, and the resolution of the observation camera is not lower than three times the resolution of the panel.

10. The composite repairing device for liquid crystal panel as claimed in claim 9, wherein the control device is further used for comparing the panel defects shown on the images collected by the observation camera with a preset defect level, and when a panel defect exceeds the preset level, the defect is determined to be irreparable.

11. The composite repairing device for liquid crystal panel as claimed in claim 9, wherein further comprising a lens device for transmitting the light emitted from the metal line repairing laser and the repairing laser employing black matrix diffusion, which lens device includes a set of lens with different magnifications.

\* \* \* \* \*